Patented Sept. 9, 1930

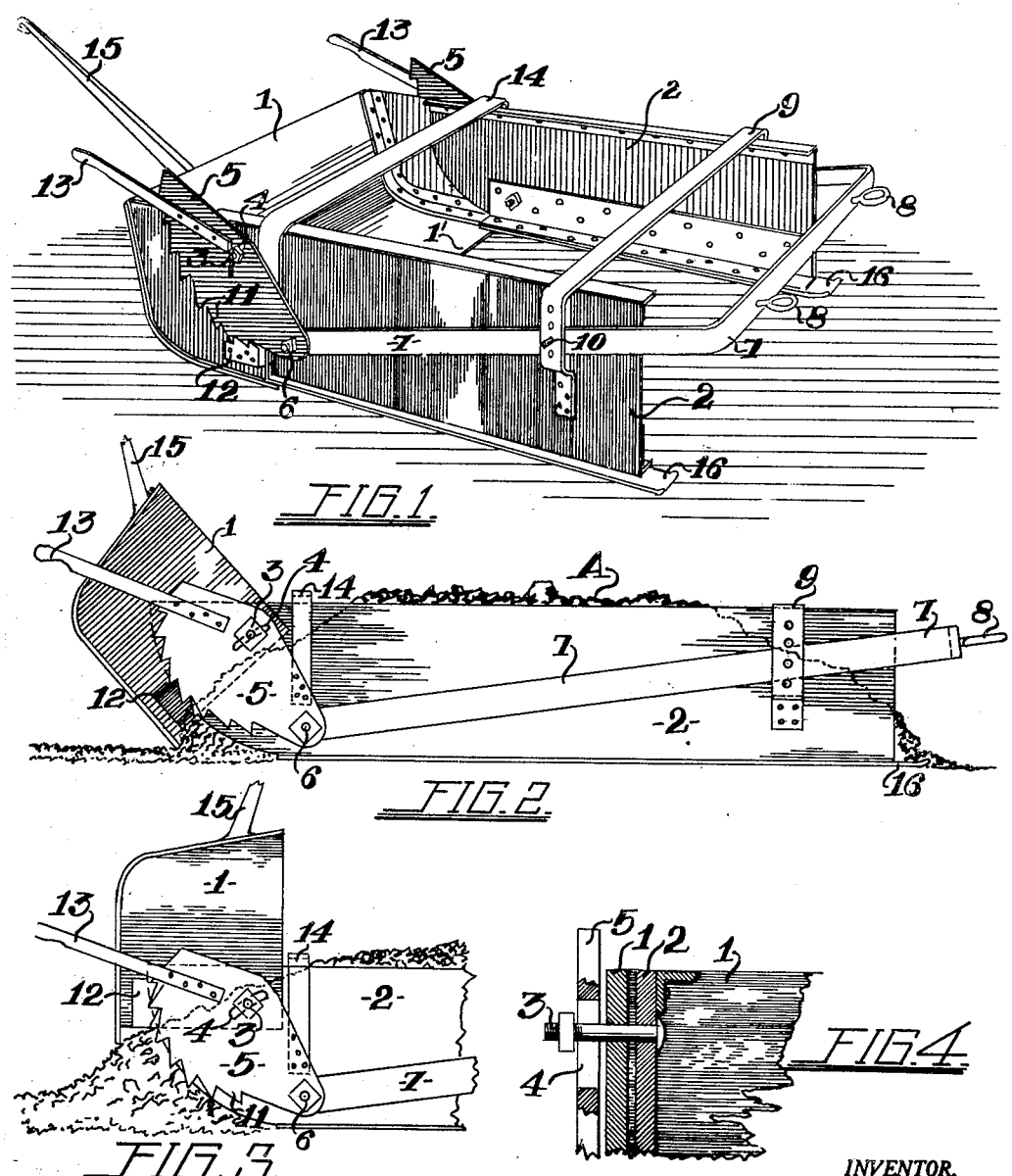

1,775,206

UNITED STATES PATENT OFFICE

EDGAR S. McCANDLISS, OF TOPEKA, KANSAS

SCRAPER

Application filed December 5, 1928. Serial No. 323,946.

My invention relates to improvements in scrapers.

The object of my invention is to provide a means for moving dirt, gravel, loose rock and the like in course of road construction, of the scraper or scoop type propelled by animals or machinery and equipped with a forward pair of sides to gather and carry the load to the point of fill or spoil at which point it can be dumped or released.

A further object of my invention is to provide a road building tool comprising a scoop type of scraper rotatably mounted within sideboards and the scoop made adjustable to the work by reason of toothed segments and detents arranged for that purpose.

A still further object of my invention is to provide a tool for road construction arranged to gather and then spread the load as desired in regard to the thickness of the deposit.

Reference is had to the accompanying drawings which form a part of this specification and wherein like characters apply to like parts in the different views.

Referring to the drawings:

Fig. 1 is a perspective view of the scraper.

Fig. 2 is an elevation of the scraper illustrating the scoop in a position of partial release.

Fig. 3 is a fragmentary elevation showing the scoop in the extreme position to release.

Figure 4 is a fragmentary view in section illustrating the arrangement of the hinge bolt or pin with respect to the scoop and adjacent parts.

A scoop or scraper 1 is hung or hinged, at each end, to the side members 2, substantially as shown, by means of spindles or bolts 3 which bolts protrude through arcuate slots 4 in the toothed segmental release levers 5.

The levers 5 are rotatably mounted on the sides 2 by the bolts 6 which also trunnion the yoke 7.

The yoke 7 carries the eyes 8 as draft connections and is adjustably positioned between the lateral brace 9 and the sides by the pins 10.

The teeth 11 on the levers 5 are based on an arc whose center coincides with the bolt 3, when the said levers are in the position shown in Fig. 1 these teeth engage the toothed detents 12 firmly attached to the scoop.

Any movement by the scoop around the bolts 3 is obstructed by the engagement of the teeth 11 with the detents 12 until the lever 5 is rotated about the bolts 6 by use of the handles 13. The arcuate slots 4, which have for their center the bolts 6, allow this and the disengagement of the teeth 11 from the detents 12 results.

The strut 14 firmly attached at both ends to the levers 5 cause them to move simultaneously.

The pole 15 is attached to the scoop 1 to serve as an actuating means to facilitate the control of the scoop movement.

The sides 2 have at their bottom edge bearing plates or skid members 16.

The scraper is attached to some means of draft such as a tractor or animals in harness by means of the eyes 8. The tractive force is transmitted through the legs of the yoke 7 to the scoop and the sides at the bolt 6. The lip or cutting edge 1' of the scoop rests at the rear ends of the skids 16 as shown.

As the scraper is pulled into a windrow of earth or gravel the collection fills the interior somewhat as shown at A in Fig. 2.

In this instance the scoop has been released to the position shown and a comparatively thin spread of the contents is allowed. The pressure on the lip of the scoop due to forward movement of the scraper will rotate it into the full release position illustrated in Fig. 3 upon the raising of either of the handles 13.

The presence of the skid members 16 prevents chattering which may be experienced from minor declivities on the work in the line of travel.

A cutting action may be obtained by allowing the scoop to pivot a few degrees thereby setting the lip at an angle to the dirt. In which case the cuttings will be eventually forced forward and the scoop can be returned to the normal position for haulage as shown in Fig. 1.

The return of the scoop to the normal position from that shown in Fig. 3 cannot be made until the levers 5 are raised.

My invention aids the work in the movement of dirt in that comparatively large quantities can be handled by its use with tractors or draft animals and in addition the dressing of the fill to grade is accomplished in a release position of the levers as indicated in Fig. 2 where heretofore this portion of the work had to be done by a separate operation.

I do not wish to be restricted to any particular materials or manner of construction and such modifications may be employed as lie within the scope of the appended claims but what I do claim as new and desire to secure by Letters Patent is:

1. In a dirt working tool, a scoop pivotally connected with two parallelly disposed plates, detents positioned on the sides of said scoop, said detents engaging toothed segmental levers, said levers pivotally affixed to the plates and the levers and detents functioning as means to maintain the pivotal position of the scoop for the purpose of gathering and dumping dirt as drawn by other means.

2. In an excavating device propelled by draft animals or engine traction, a scoop in combination with two upright parallel sides rigidly positioned relative to each other and skids affixed to their lower edges, segmental members rotatably mounted in said sides and in engagement with the scoop, and the scoop pivotally connected to the said sides and adjustable to the work for the purpose of gathering and releasing the material under construction.

3. In a scraper, a scoop in combination with parallelly arranged vertical sides and toothed adjusting members, and detents carried by the scoop, said scoop pivotally connected to the said sides and said adjusting members pivotally affixed to the sides, and the adjusting members engaging the scoop by means of teeth disposed on their lower extremity, said teeth being adapted to engage with said detents and said adjusting members being rockable on the sides to release the engagement of the teeth with the detent and to re-engage the detents when the scoop has met the position necessary for usage for the purpose of scraping and removing dirt as drawn by other means.

4. In dirt moving machinery comprising a scoop pivotally mounted between two parallel sides and having detents at either end thereof, toothed sectors, the said toothed sectors being pivotally connected to the sides of the mechanism and having teeth for engagement with the said detents, the teeth being based on an arc of a circle whose center coincides with the pivotal point of the scoop when the teeth are in engagement with the detent substantially as shown.

5. In a mechanism of the kind described, the combination of a scoop mounted between two parallel sides and carrying a detent on each side thereof and a pair of levers each comprising a toothed sector one end of which is pivotally connected to the parallel sides and the toothed edge of which is in engagement with the detents, means to rotate the scoop and means to rock the levers substantially as shown.

In testimony whereof I affix my signature.

EDGAR S. McCANDLISS.